3,328,412
1-ARYL OR HETEROARYL 2-ACYL-1,2,3,4-TETRAHYDRO-BETA-CARBOLINES
John David Atkinson and Roy Hull, Macclesfield, England, assignors to Imperial Chemical Industries Limited, London, England, a corporation of Great Britain
No Drawing. Filed Sept. 9, 1965, Ser. No. 486,194
Claims priority, application Great Britain, Sept. 16, 1964, 37,844/64
5 Claims. (Cl. 260—294.8)

This invention relates to novel β-carboline derivatives which possess valuable analgesic properties and which have long-acting characteristics.

According to the invention we provide novel β-carboline derivatives of the formula:

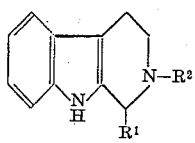

wherein $R^1$ stands for an aryl or heterocyclic radical, either of which may optionally be substituted by one or more alkyl or hydroxy radicals, and $R^2$ stands for an acyl radical.

As a suitable value for $R^1$ when it stands for an aryl radical there may be mentioned, for example, a phenyl or hydroxyphenyl radical. As a suitable value for $R^1$ when it stands for a heterocyclic radical there may be mentioned, for example, a 5-membered heterocyclic radical containing one hetero-atom, for example a pyrrolyl or thienyl radical. As suitable values for the optional alkyl substituents in $R^1$ there may be mentioned, for example, alkyl radicals of not more than 4 carbon atoms, for example methyl radicals. Thus, particular values for $R^1$ are the phenyl, o-hydroxyphenyl, 2-pyrrolyl, 2-thienyl or 2,5-dimethyl-pyrrol-3-yl radicals.

As a suitable value for $R^2$ when it stands for an acyl radical there may be mentioned, for example, an alkanoyl radical of not more than 6 carbon atoms, for example the acetyl radical, or an aroyl radical of not more than 10 carbon atoms, for example the benzoyl radical.

Particular novel β-carboline derivatives of the invention are: 2-acetyl-1,2,3,4-tetrahydro-1-2'-pyrrolyl-β-carboline, 2 - benzoyl-1,2,3,4-tetrahydro-1-2'-pyrrolyl-β-carboline, 2-acetyl-1-(2,5-dimethylpyrrol-3-yl)-1,2,3,4-tetrahydro-β-carboline, 2-acetyl-1,2,3,4-tetrahydro-1,2'-thienyl-β-carboline, 2-acetyl-1,2,3,4-tetrahydro-1-phenyl-β-carboline and 2-acetyl-1,2,3,4-tetrahydro-1-o-hydroxyphenyl-β-carboline, and the first three of these are preferred compounds.

According to a further feature of the invention we provide a process for the manufacture of the β-carboline derivatives of the invention which comprises the ring closure of a compound of the formula:

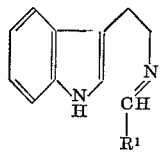

wherein $R^1$ has the meaning stated above, in the presence of an acylating agent derived from the acid of the formula $R^2$—OH wherein $R^2$ has the meaning stated above.

As a suitable acylating agent there may be mentioned, for example, an acid halide, for example an acid chloride of the formula $R^2Cl$, or an acid anhydride of the formula $R^2$—O—$R^2$. Particularly valuable acylating agents are benzoyl chloride or acetic anhydride.

The ring closure may be carried out in an inert solvent or diluent, for example benzene or acetic acid, or in an acid-binding solvent, for example pyridine. The ring closure may be carried out at ambient temperature or at an elevated temperature, for example at a temperature of between 90° and 110° C.

The starting material for the last-mentioned process may be obtained by the interaction of tryptamine and an aldehyde of the formula $R^1.CHO$, wherein $R^1$ has the meaning stated above. The interaction may be carried out in the presence of a diluent or solvent, for example benzene or acetic acid, and it may be carried out at a temperature of about −10° to 30° C., or at an elevated temperature. It is to be understood that the starting material may be isolated, or it may be prepared in situ and used without isolation.

According to a further feature of the invention we provide a process for the manufacture of the β-carboline derivatives of the invention which comprises the acylation of a β-carboline derivative of the formula:

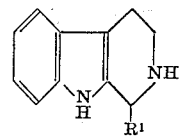

wherein $R^1$ has the meaning stated above, or a salt thereof with an acylating agent derived from the acid of the formula $R^2$—OH wherein $R^2$ has the meaning stated above.

The acylating agent may be, for example, an acid halide, for example an acid chloride of the formula $R^2Cl$, or an acid anhydride of the formula $R^2$—O—$R^2$. Particularly valuable acylating agents are benzoyl chloride or acetic anhydride.

The acylation may be carried out in a diluent or solvent, for example water or benzene. It may optionally be carried out in the presence of an acid-binding agent, for example sodium hydroxide or in an acid-binding solvent, for example pyridine. The interaction may be carried out at a temperature of between −10° and 30° C., or at an elevated temperature, for example at a temperature of between 90° and 110° C.

The β-carboline derivatives which form the starting material for the last-mentioned process may be prepared by the ring closure of a compound of the formula:

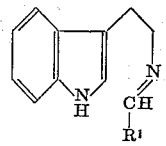

wherein $R^1$ has the meaning stated above, or by the catalytic hydrogenation of a dihydro-β-carboline derivative of the formula:

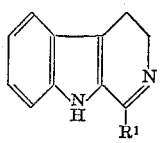

wherein $R^1$ has the meaning stated above.

As indicated above, the β-carboline derivatives of this invention are long-acting analgesic agents. They are preferably administered in the form of conventional orally-administrable unit dosage forms, in particular tablets, and the dosage of the preferred compounds is 5–15 mg. per kg. bodyweight approximately once or twice per day.

The invention is illustrated but not limited by the following examples in which the parts are by weight:

Example 1

The solution obtained by dissolving 6.4 parts of tryptamine and 3.9 parts of 2-formylpyrrole in 35 parts of benzene is cooled and treated with 8 parts of acetic anhydride with frequent shaking. The mixture is kept at ambient temperature for 2 hours, and is then washed first with aqueous sodium carbonate solution and then with water. The solution is dried and evaporated to dryness, and the residue is crystallised from methanol. There is thus obtained 2-acetyl-1,2,3,4-tetrahydro-1-2'-pyrrolyl-β-carboline, which melts at 233–235° C.

Example 2

The solution obtained by dissolving 1.6 parts of tryptamine and 0.95 part of 2-formylpyrrole in 17 parts of benzene is filtered, and the filtrate is treated with 0.85 part of benzoyl chloride. An exothermic reaction results. The solution is cooled and the precipitate is collected by filtration and crystallised from n-butanol. There is thus obtained 2-benzoyl-1,2,3,4-tetrahydro-1-2'-pyrrolyl-β-carboline, which melts at 262–263° C.

Example 3

1.6 parts of tryptamine and 1.1 parts of 2-formylthiophen are dissolved in 20 parts of benzene. The solution is filtered and evaporated to dryness, and there is thus obtained a crude Schiff base, M.P. 98–102° C. The Schiff base is dissolved in the least possible quantity of pyridine at 100° C., and to this solution are added 1.1 parts of acetic anhydride. The mixture is heated at 100° C. for 3 hours, and the product is precipitated from the cooled solution by the dropwise addition of water. The precipitate is collected by filtration and is crystallised from ethanol. There is thus obtained 2-acetyl-1,2,3,4-tetrahydro-1-2'-thienyl-β-carboline, M.P. 251–252° C.

Example 4

1.6 parts of tryptamine and 1.25 parts of 3-formyl-2,5-dimethylpyrrole are dissolved in 20 parts of benzene. The solution is filtered and evaporated to dryness, and there is thus obtained a crude Schiff base. The Schiff base is dissolved in the least possible quantity of pyridine at 100° C., and to this solution are added 1.1 parts of acetic anhydride. The mixture is then heated at 100° C. for a further 2 hours. The cooled solution is diluted with 40 parts of ether, washed with aqueous sodium carbonate solution, then with water, dried, and evaporated to dryness. The residue is crystallised from ethanol. There is thus obtained 2-acetyl-1-(2,5-dimethylpyrrol-3-yl)-1,2,3,4-tetrahydro-β-carboline, M.P. 263–266° C.

Example 5

A mixture of 2.5 parts of 1,2,3,4-tetrahydro-1-phenyl-β-carboline and 20 parts of acetic anhyride is heated at 95–100° C. for 1 hour. The solution is allowed to cool and the product is removed by filtration. It is crystallised from ethanol and there is thus obtained 2-acetyl-1,2,3,4-tetrahydro-1-phenyl-β-carboline, M.P. 273–275° C.

Example 6

0.6 part of salicylaldehyde and 0.53 part of acetic anhydride are added to a solution of 0.8 part of tryptamine in 10 parts of glacial acetic acid, and the mixture is heated at 95–100° C. for 4 hours. The mixture is cooled, basified with aqueous sodium bicarbonate solution, and extracted with ether. The ethereal solution is evaporated to dryness and the residue is crystallised from ethanol. There is thus obtained 2-acetyl-1,2,3,4-tetrahydro-1-o-hydroxyphenyl-β-carboline, M.P. 236–237° C.

What we claim is:
1. A compound of the formula:

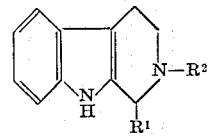

wherein $R^1$ is selected from the group consisting of phenyl, hydroxy phenyl, lower alkyl phenyl, 5-membered heterocyclic rings containing one nitrogen or sulphur atom, and $R^2$ stands for acyl selected from the group consisting of alkanoyl of up to 6 carbon atoms and aroyl of up to 10 carbon atoms.

2. A compound as claimed in claim 1 wherein $R^1$ is a 5-membered heterocyclic radical containing one nitrogen or sulphur atom, and $R^2$ is acetyl.

3. A compound as claimed in claim 1 wherein $R^1$ is a 5-membered heterocyclic radical containing one nitrogen or sulphur atom and $R^2$ is benzoyl.

4. A compound selected from the group consisting of 2 - acetyl-1,2,3,4-tetrahydro-1-2'-pyrrolyl-β-carboline; 2-benzoyl - 1,2,3,4-tetrahydro-1,2'-pyrrolyl-β-carboline; 2-acetyl-1,2,3,4-tetrahydro-1-2'-thienyl-β-carboline; 2-acetyl - 1-(2,5-dimethylpyrrol-3-yl)-1,2,3,4-tetrahydro-β-carboline and 2-acetyl-1,2,3,4-tetrahydro-1-phenyl-β-carboline.

5. The compound 2-acetyl-1,2,3,4-tetrahydro-1-o-hydroxyphenyl-β-carboline.

No references cited.

WALTER A. MODANCE, *Primary Examiner*.

A. ROTMAN, *Assistant Examiner*.